(12) United States Patent
Tsai et al.

(10) Patent No.: US 8,353,746 B2
(45) Date of Patent: Jan. 15, 2013

(54) AIR CONDUCTING DEVICE

(75) Inventors: Ho-Chin Tsai, Taipei Hsien (TW); Lung-Sheng Tsai, Taipei Hsien (TW); Yi-Lung Chou, Taipei Hsien (TW); Li-Ping Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 903 days.

(21) Appl. No.: 12/463,476

(22) Filed: May 11, 2009

(65) Prior Publication Data
US 2010/0105313 A1 Apr. 29, 2010

(30) Foreign Application Priority Data
Oct. 27, 2008 (CN) .......................... 2008 2 0302558

(51) Int. Cl.
*F24F 7/00* (2006.01)
(52) U.S. Cl. ........................................... 454/284
(58) Field of Classification Search ................... 454/284
See application file for complete search history.

(56) References Cited

U.S. PATENT DOCUMENTS

| | | | |
|---|---|---|---|
| 7,262,964 B1 * | 8/2007 | Barsun | 361/695 |
| 2008/0117589 A1 * | 5/2008 | Carrera et al. | 361/687 |
| 2009/0034190 A1 * | 2/2009 | Tsai et al. | 361/695 |
| 2009/0233537 A1 * | 9/2009 | Kao et al. | 454/184 |
| 2010/0020487 A1 * | 1/2010 | Lee et al. | 361/679.49 |

* cited by examiner

*Primary Examiner* — John K Fristoe, Jr.
*Assistant Examiner* — Reinaldo Sanchez-Medina
(74) *Attorney, Agent, or Firm* — Altis Law Group, Inc.

(57) ABSTRACT

An air conducting device is used for removing heat from at least one component by directing airflow flowing along a first direction. The first direction is parallel to the at least one component. The air conducting device includes an airduct receiving the at least one component therein, and an air guiding member. The air guiding member is attached to an inner side of the airduct. The air guiding member includes a plurality of resilient legs. The legs extend diagonally relative to the first direction in a first state. The legs are able to accommodate the at least one component in a second state. Each leg in the first state is able to serve as a barrier to the airflow.

12 Claims, 5 Drawing Sheets

AIR CONDUCTING DEVICE

BACKGROUND

1. Technical Field

The present disclosure relates to air conducting devices, and particularly to an air conducting device in a computer.

2. Description of Related Art

Air conducting devices are often used in computers coupled with fans for dissipating heat from electronic components. A conventional computer includes a plurality of heat dissipating components, an "n"-shaped airduct covering the heat dissipating components, and a fan generating airflow for dissipating heat from the heat dissipating components. This airduct can direct the airflow to all the locations designed to receive components. However, in practice, not all component locations are used, and do not need the airflow. On this point, the efficiency of the heat dissipation becomes lower.

DETAILED DESCRIPTION

Figure 1:
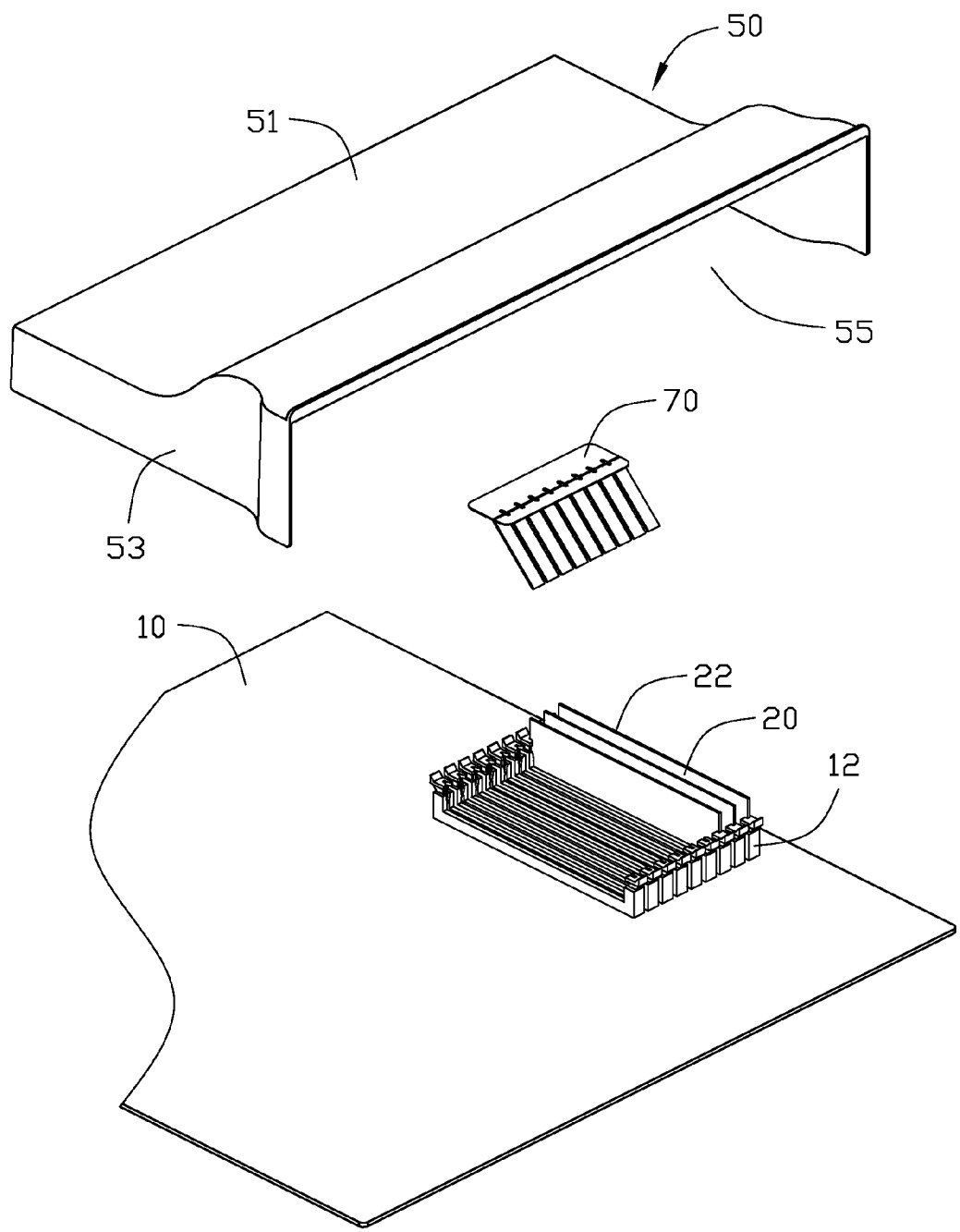
FIG. 1 is an exploded, isometric view of one embodiment of an air conducting device, the air conducting device including a motherboard, an airduct and an air guiding member.

Referring to FIG. 1, in one embodiment, an air conducting device is configured for removing heat from a plurality of memories 20 or other heat generating electronic components by directing airflow. The memories 20 are installed in a plurality of parallel slots 12 of a motherboard 10. The memories 20 are optionally installed in the slots 12. Each memory 20 has a top surface 22. The air conducting device includes an airduct 50 and an air guiding member 70.

The airduct 50 includes a top wall 51 and two side walls 53 extending downwardly from the top wall 51. The top wall 51 is parallel to the motherboard 10 thereby defining an airflow passageway 55 for guiding the airflow therethrough.

Figure 2:
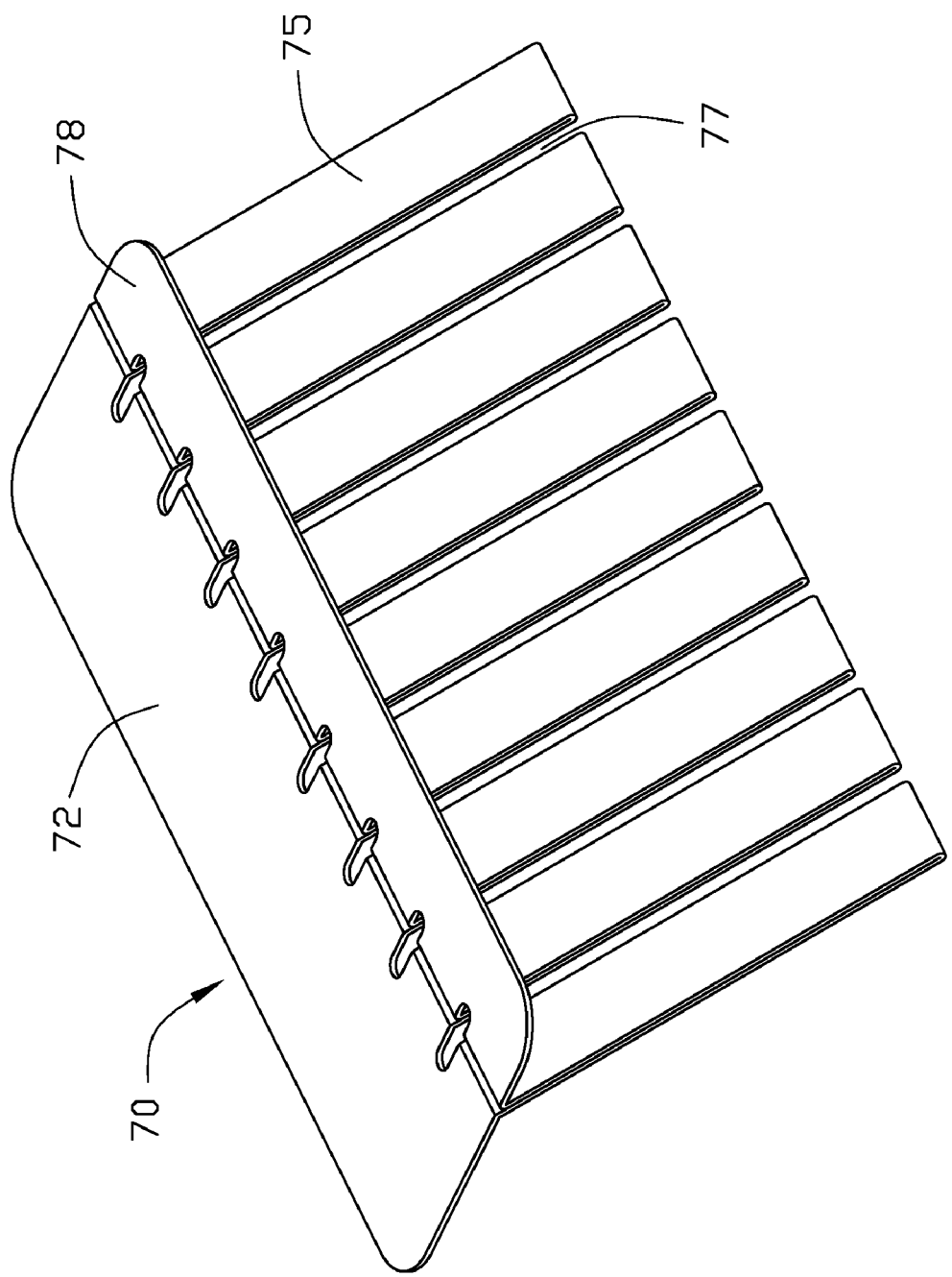
FIG. 2 is an enlarged view of the air guiding member of FIG. 1.
Figure 3:
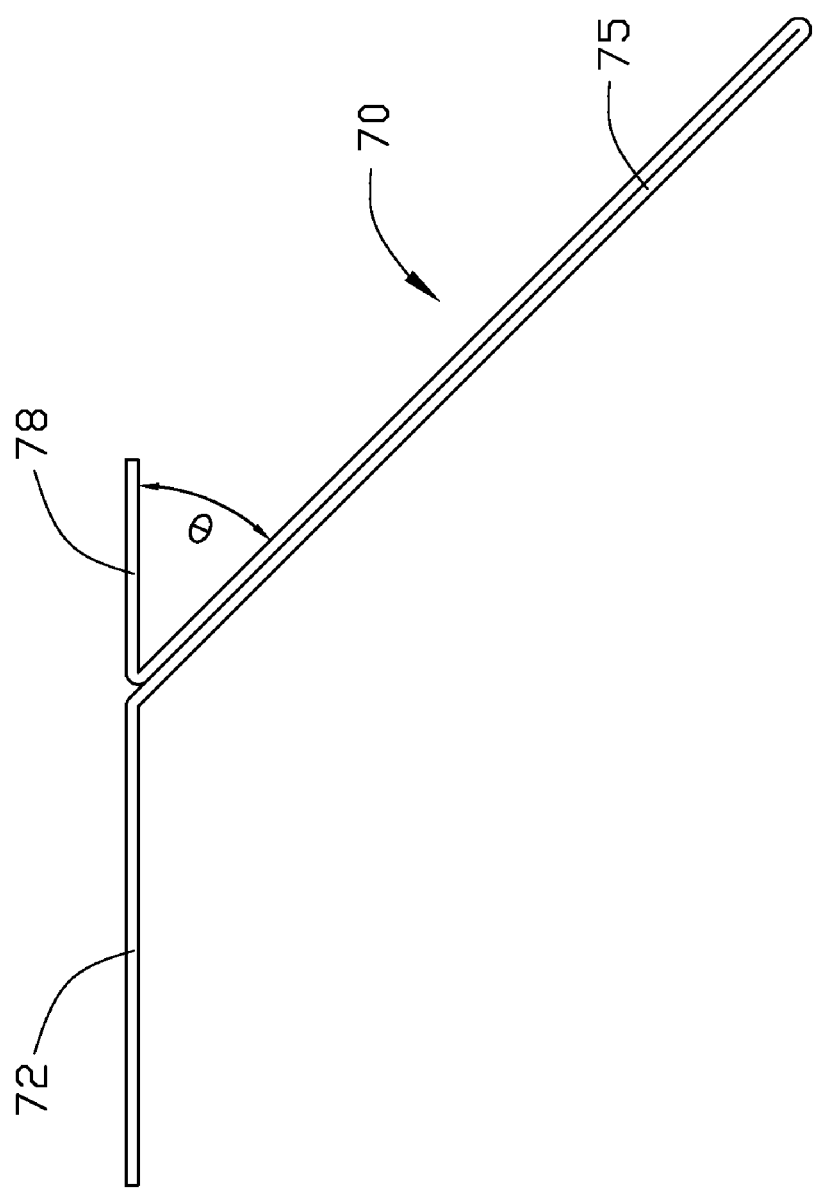
FIG. 3 is a left view of the air guiding member of FIG. 2.

Referring to FIG. 2 and FIG. 3, the air guiding member 70 includes a first base plate 72, a second base plate 78 and a plurality of resilient legs 75 bent from the first base plate 72 and the second base plate 78. The air guiding member 70 can be made of polypropylene and plate shaped. The resilient plate is bent 180 degrees back upon itself to form the legs 75. Each leg 75 extends at a sharp angle θ relative to the second base plate 78 in an original state. A split 77 is defined between two adjacent legs 75.

Figure 4:
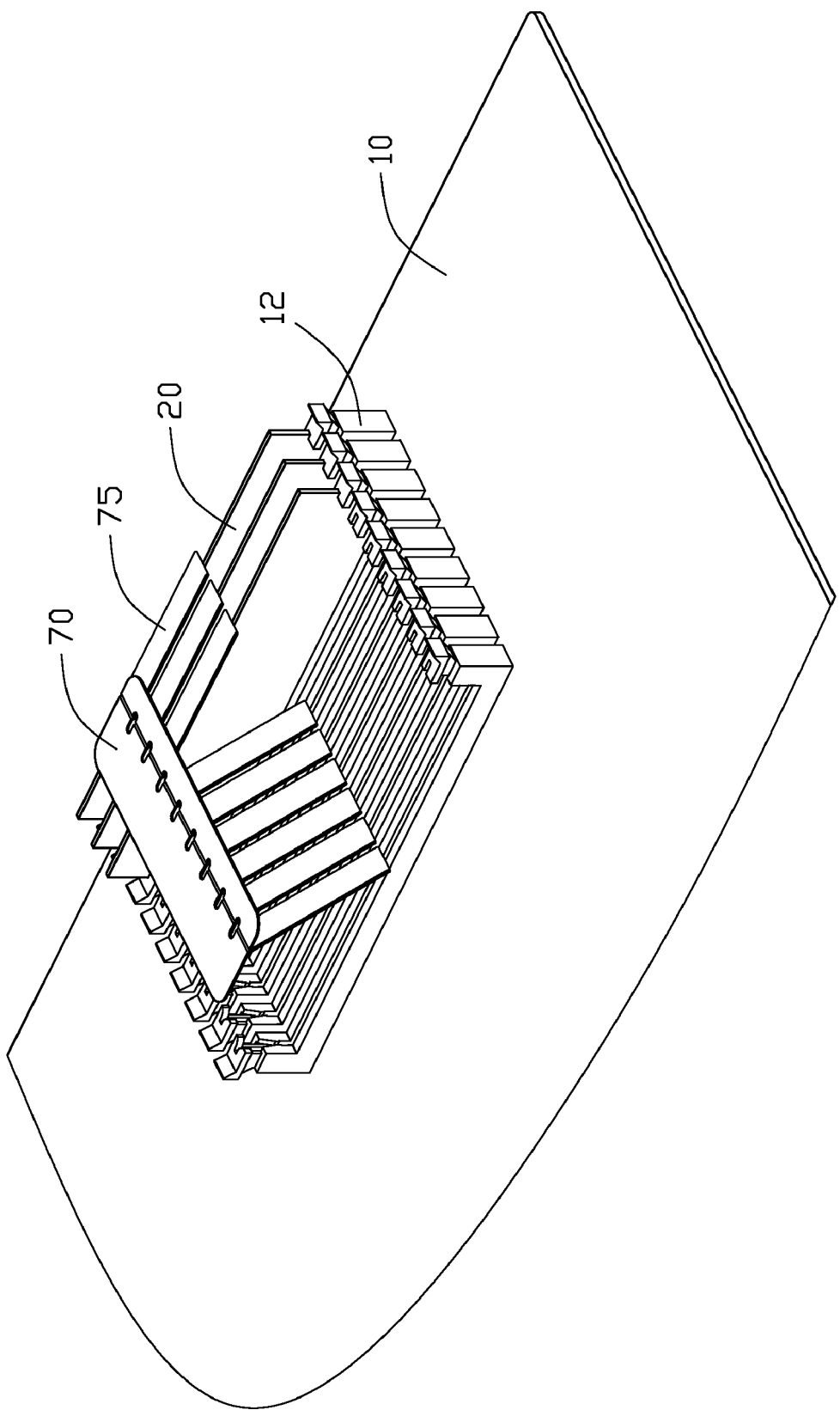
FIG. 4 is an assembled view of FIG. 1 with the airduct being omitted.
Figure 5:
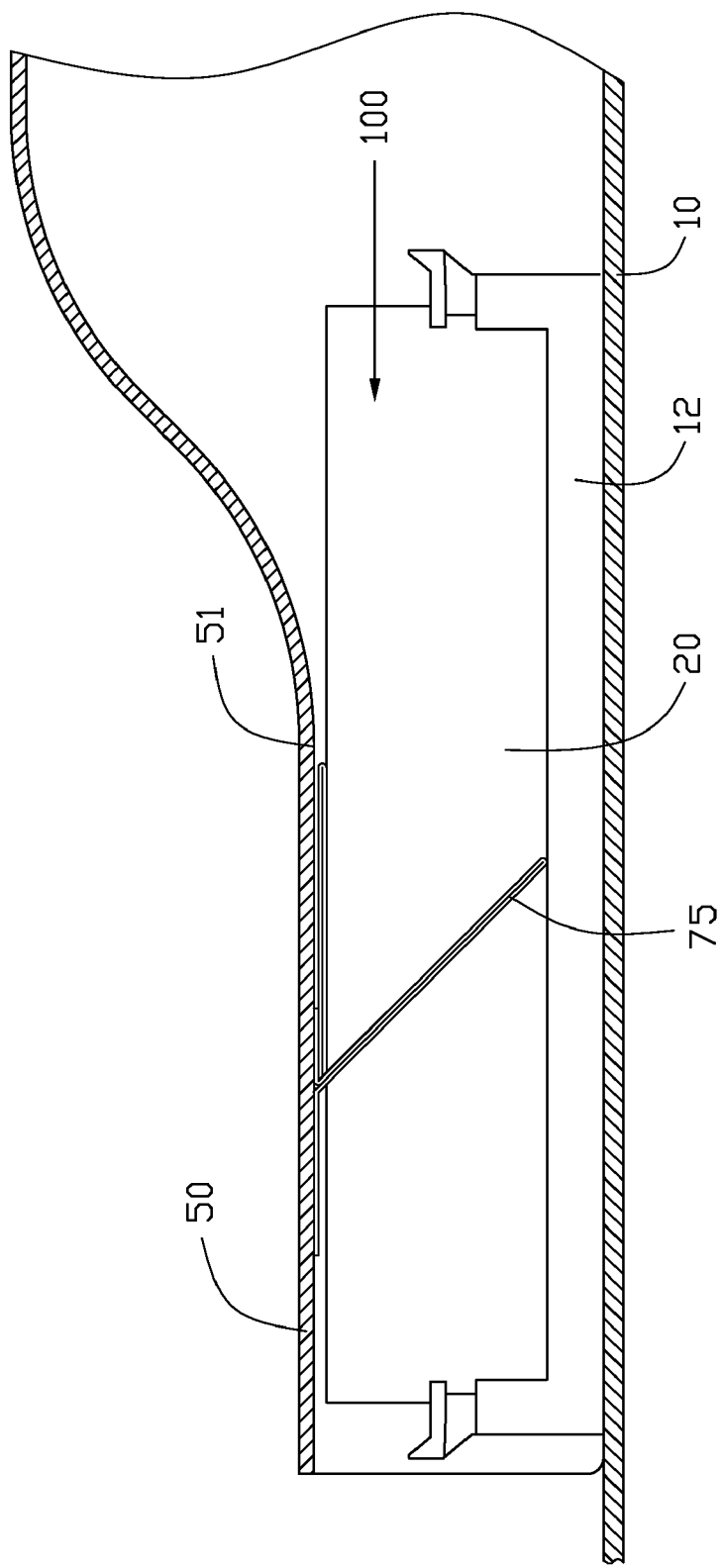
FIG. 5 is a left sectional view of the air conducting device of the embodiment.

Referring to FIG. 4 and FIG. 5, in assembling, the first base plate 72 and the second base plate 78 of the air guiding member 70 are attached to an inner surface of the top wall 51. The airduct 10 and the air guiding member 70 are placed on the motherboard 10 with the slots 12 of the motherboard 10 received in the airflow passageway 55 and each leg 75 of the air guiding member 70 extending towards each slot 12. The legs 75 extending towards those of the slots 12 which are occupied by the memories 20 are urged to bend up to accommodate the memories 20. The accommodated legs 75 rest on the memories 20. Other legs 75 extending towards those of the slots 12 that are empty maintain their original state. The legs 75 in the original state have a sharp angle relative to an inlet direction of the airflow, and serve as a barrier to the airflow. In another embodiment, a distal end of each leg 75 in the first state may abut on the corresponding slot 12, such that these legs 75 can be made slightly deform upward.

When using the air conducting device, the airflow flows along a blowing direction 100 in the passageway 55. The airflow travels through the space adjacent to the memories 20 and the airflow is blocked by the legs 20 stand in the original state, such that the airflow is effectually used by decreasing the ability of the air to flow by the unused area in the airflow passageway. When one or more of the memories 20 are added or removed, the legs 75 may be bent up to avoid blocking the airflow or allowed to rebound to the original state to block the airflow. Thus, the air conducting device has good flexibility to accommodate the addition and removal of assembled memories.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An air conducting device for removing heat from at least one component by conducting airflow flowing along a first direction, the first direction parallel to the at least one component, the air conducting device comprising:
   an airduct receiving the at least one component therein; and
   an air guiding member attached to an inner side of the airduct, the air guiding member comprising a plurality of resilient legs, each resilient leg comprises a plate that is bent back upon itself at substantially 180 degrees, each leg extending at a diagonal relative to the first direction in a first state and being able to accommodate the at least one component in a second state;
   wherein each leg in the first state is able to serve as a barrier to the airflow.

2. The air conducting device of claim 1, wherein the plate is made of polypropylene.

3. The air conducting device of claim 1, wherein a sharp angle is defined between the legs in the first state and an inlet direction of the airflow.

4. The air conducting device of claim 1, wherein a split is defined between at least two adjacent legs.

5. The air conducting device of claim 1, wherein the airduct comprises a top wall, and two side walls extending from the top wall, and the air guiding member is attached to an inner surface of the top wall.

6. The air conducting device of claim 1, wherein each leg extends approximately the same diagonal relative to the first direction in the first state.

7. An electronic device comprising:
   a motherboard having a plurality of paralleled slots;
   at least one component installed in the slots;
   an airduct covering the at least one component; and
   an air guiding member attached to an inner side of the airduct, the air guiding member comprising a plurality of resilient legs, each resilient leg comprises a plate that is turned substantially 180 degree back upon itself, the legs extending at a diagonal relative to an airflow direction in an original state, wherein at least one of the legs is capable of being bent and resting on at least one component.

8. The electronic device of claim 7, wherein the plate is made of polypropylene.

9. The electronic device of claim 7, wherein a split is defined between at least two adjacent legs.

10. The electronic device of claim 7, wherein the airduct comprises a top wall, and two side walls extending from the top wall, and the air guiding member is attached to an inner surface of the top wall.

11. The electronic device of claim 7, wherein each leg extends at approximately the same diagonal relative to the airflow direction in the original state.

12. The electronic device of claim 7, wherein a distal end of each leg abuts to one of the slots when each leg is in the original state.

* * * * *